(12) United States Patent
Chtrasberg et al.

(10) Patent No.: US 9,703,667 B2
(45) Date of Patent: Jul. 11, 2017

(54) HARDWARE-BASED EDGE PROFILING

(71) Applicant: International Business Machines Corporation, Armonk, NY (US)

(72) Inventors: Grigori Chtrasberg, Haifa (IL); Moshe Klausner, Ramat Yishay (IL); Nitzan Peleg, Haifa (IL); Yaakov Yaari, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 14/628,253

(22) Filed: Feb. 22, 2015

(65) Prior Publication Data

US 2016/0246697 A1   Aug. 25, 2016

(51) Int. Cl.
*G06F 9/44* (2006.01)
*G06F 11/34* (2006.01)
*G06F 11/36* (2006.01)
*G06F 11/30* (2006.01)

(52) U.S. Cl.
CPC ...... *G06F 11/3466* (2013.01); *G06F 11/3024* (2013.01); *G06F 11/3409* (2013.01); *G06F 11/36* (2013.01); *G06F 11/3636* (2013.01); *G06F 11/3648* (2013.01); *G06F 2201/88* (2013.01)

(58) Field of Classification Search
None
See application file for complete search history.

(56) References Cited

U.S. PATENT DOCUMENTS

| 6,519,766 B1* | 2/2003 | Barritz | G06F 11/3466 |
| | | | 714/E11.2 |
| 6,795,964 B2* | 9/2004 | Ramasamy | G06F 11/3612 |
| | | | 712/E9.083 |
| 7,458,065 B2* | 11/2008 | Sanchez | G06F 9/4843 |
| | | | 717/131 |

(Continued)

OTHER PUBLICATIONS

Chen et al., Taming Hardware Event Samples for Precise and Versatile Feedback Directed Optimizations, published by IEEE Transaction on computers vol. 62, No. 2, Feb. 2014, pp. 376-389.*

(Continued)

*Primary Examiner* — Tuan Q. Dam
*Assistant Examiner* — Zheng Wei

(57) ABSTRACT

A method comprising: counting each occurrence of a hardware event by a Performance Monitoring Counter of a hardware processor during the execution of a target program code; orderly and continuously storing in a buffer of a Taken Branch Trace (TBT) Facility of said hardware processor a predefined TBT size of last taken branches of said target program code during its execution; every time said counting equals a sampling rate, triggering sampling of said buffer, to receive a TBT comprising current said predefined TBT size of last taken branches; constructing a full branch trace for each said TBT based on said target program code; extracting a predefined Chopped Branch Trace (CBT) size of last branches from each said full branch trace, to receive a chopped branch trace for said each TBT; and incrementally storing each said chopped branch trace to generate an edge profile of said target program code.

16 Claims, 3 Drawing Sheets

(56) References Cited

U.S. PATENT DOCUMENTS

| | | | |
|---|---|---|---|
| 7,617,420 B2* | 11/2009 | Kimura | G06F 11/3636 714/45 |
| 8,214,817 B2 | 7/2012 | Mendelson et al. | |
| 8,352,928 B2* | 1/2013 | Kimura | G06F 8/443 717/128 |
| 8,489,866 B2* | 7/2013 | Mestan | G06F 11/3476 712/227 |
| 8,578,216 B2* | 11/2013 | Sato | G06F 11/3471 714/37 |
| 2002/0104075 A1* | 8/2002 | Bala | G06F 9/45504 717/136 |
| 2002/0194580 A1* | 12/2002 | Ramasamy | G06F 11/3612 717/130 |
| 2004/0015930 A1* | 1/2004 | Wu | G06F 11/3612 717/158 |
| 2005/0289400 A1* | 12/2005 | Kimura | G06F 11/3636 714/45 |
| 2006/0230391 A1 | 10/2006 | Alexander et al. | |
| 2007/0074081 A1* | 3/2007 | DeWitt | G06F 11/3409 714/45 |
| 2009/0083526 A1* | 3/2009 | Kimura | G06F 8/443 712/234 |
| 2010/0235686 A1* | 9/2010 | Sato | G06F 11/3471 714/45 |
| 2011/0113224 A1 | 5/2011 | Isshiki et al. | |
| 2012/0005463 A1* | 1/2012 | Mestan | G06F 11/3476 712/240 |
| 2012/0167058 A1 | 6/2012 | Codina et al. | |
| 2014/0075249 A1* | 3/2014 | Sato | G06F 11/3471 714/45 |
| 2015/0058606 A1* | 2/2015 | Madampath | G06F 9/30058 712/236 |
| 2015/0058825 A1* | 2/2015 | Madampath | G06F 11/34 717/128 |
| 2016/0110281 A1* | 4/2016 | Cheng | G06F 11/3664 714/38.1 |

OTHER PUBLICATIONS

Alex Shye et al., "Analyis of Path Profiling Information Generated with Performance Monitoring Hardware" Interaction between Compilers and Computer Architectures, 2005. INTERACT-9. 9th Annual Workshop on Feb. 13, 2005, pp. 34-43.

Vinodha Ramasamy et al., "Feedback-Directed Optimizations with Estimated Edge Profiles from Hardware Event Sampling", Proceedings of GCC Summit 2008, pp. 87-102.

Thomas M. Conte et al., "Accurate and practical profile-driven compilation using the profile buffer", MICRO 29 Proceedings of the 29th annual ACM/IEEE international symposium on Microarchitecture, pp. 36-45, 1996.

Wu & Larus., "Static branch frequency and program profile analysis", MICRO 27 Proceedings of the 27th annual international symposium on Microarchitecture, pp. 1-11.

* cited by examiner

HARDWARE-BASED EDGE PROFILING

BACKGROUND

The present invention relates to the field of feedback directed code optimization.

Feedback directed code optimization (including basic block reordering, function inlining, loop unrolling, etc.) is a beneficial program optimization used by all kinds of program optimization tools, including static optimization tools (e.g., compilers and post-link optimizers), as well as dynamic optimization tools. While edge profile may be highly effective for such optimization, as opposed, for example, to basic block profile, the task of collecting an edge profile may be more difficult.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising: counting each occurrence of a hardware event by a Performance Monitoring Counter (PMC) of a hardware processor during the execution of a target program code; orderly and continuously storing in a buffer of a Taken Branch Trace Facility (TBTC) of said at least one hardware processor a predefined Taken Branch Trace (TBT) size of last taken branches of said target program code during its execution; every time said counting equals a sampling rate, triggering sampling of said buffer, to receive a taken branch trace comprising current said predefined TBT size of last taken branches; constructing a full branch trace for each said taken branch trace based on said target program code, wherein said full branch trace comprises all of the completed branches of said target program code between and including the first and last taken branches of said taken branch trace; extracting a predefined Chopped Branch Trace (CBT) size of last branches from each said full branch trace, to receive a chopped branch trace for said each taken branch trace; and incrementally storing each said chopped branch trace to generate an edge profile of said target program code.

There is provided, in accordance with another embodiment, a computer program product comprising a non-transitory computer-readable storage medium having operating program code embodied therewith, the operating program code executable by at least one hardware processor, wherein the at least one hardware processor is configured to: count each occurrence of a hardware event during the execution of a target program code; orderly and continuously store in a buffer a predefined TBT size of last taken branches of said target program code during its execution; and every time said counting equals a sampling rate, trigger sampling of said buffer, to receive a taken branch trace comprising current said predefined TBT size of last taken branches, and wherein the operating program code is executable by the at least one hardware processor to: construct an full branch trace for each said taken branch trace based on said target program code, wherein said full branch trace comprises all of the completed branches of said target program code between and including the first and last taken branches of said taken branch trace; extract a predefined CBT size of last branches from each said full branch trace, to receive a chopped branch trace for said each taken branch trace; and incrementally store each said chopped branch trace to generate an edge profile of said target program code.

There is provided, in accordance with a further embodiment, a system comprising at least one hardware processor, the at least one hardware processor comprising: a Taken Branch Trace Facility (TBTC) comprising a buffer, the TBTC configured to orderly and continuously store in said buffer a predefined TBT size of last taken branches of multiple branches of a target program code during its executing; a Performance Monitoring Counter (PMC) configured, during the executing of said target program code, to: a. count each occurrence of a hardware event, and b. every time said count equals a sampling rate, trigger sampling of said BTF, to receive a taken branch trace comprising current said predefined TBT size of last taken branches, wherein the hardware processor is configured, by executing an operating program code, to: construct a full branch trace for each taken branch trace based on said target program code, wherein said full branch trace comprises all of the completed branches of said target program code between and including the first and last taken branches of said taken branch trace, extract a predefined CBT size of last branches from each said full branch trace, to receive a chopped branch trace for said each taken branch trace, and incrementally store in a storage device each said chopped branch trace to generate an edge profile of said target program code.

In some embodiments, the storing of said predefined TBT size of last taken branches is performed in a cyclic manner.

In some embodiments, said sampling rate is variable, said sampling rate value equals a predefined number summed with a randomly chosen delta, and the values of said randomly chosen delta are substantially lower than the value of said predefined number.

In some embodiments, said counting equals said sampling rate once a nontaken branch is completed, and wherein said method further comprises appending the nontaken branch to the full branch trace.

In some embodiments, the edge profile is a call-graph profile and the branch is a function call.

In some embodiments, the occurrence of a hardware event is a completion of a branch of the target program code.

In some embodiments, the occurrence of a hardware event is a completion of an instruction of the target program code.

In some embodiments, said sampling rate is predefined.

In some embodiments, the buffer is cyclic.

In addition to the exemplary aspects and embodiments described above, further aspects and embodiments will become apparent by reference to the figures and by study of the following detailed description

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
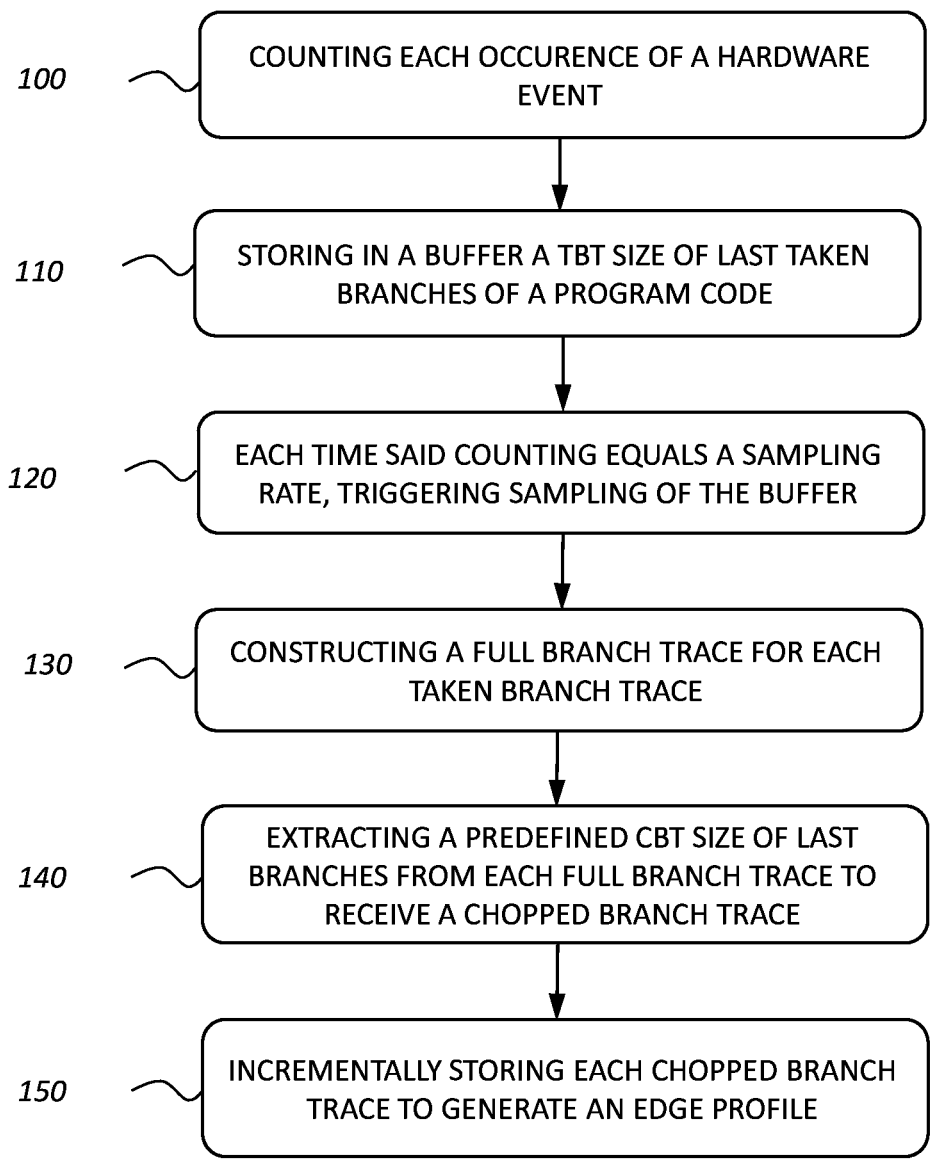
FIG. 1 shows a flowchart of a method, constructed and operative in accordance with an embodiment of the disclosed technique.

The disclosed method, hardware processor and computer program product provide a reliable and uniform edge profiling, based on an approach which is both accurate and lightweight, thus allowing software optimization in a more rapid manner.

A key attribute for an edge profile is uniformity. A uniform edge profile is one where the ratio between any two edges in the profile is proportional to that of the full edge profile (i.e., such that both profiles present a similar measure of edge dispersion). Since code reordering, for example, is concerned with the relative execution count (also known as "heat") of the edges, uniform edge profile may have the same quality as full profile as far as code reordering is concerned. Hence, a reliable uniform edge profile may be crucial for many feedback-directed optimizations, like basic-block code reordering and function inlining. Availability of such profile may provide a competitive edge to the underlying platform.

Collecting a uniform profile which has smaller execution counts than the full profile may be preferable since it has lower overhead and therefore its effect on the program execution is smaller and a more precise model of the real workload may be received. Recent processors are equipped with a facility, termed here Taken Branch Trace Facility (TBTF), configured to take snapshot of short taken branch traces. Typically these snapshots are collected in fixed intervals of instructions or cycles. Collecting edge profile using these taken branch traces is non-uniform because of it consists of taken branches and so its span varies in terms of the complete branch stream. Additional biasing results when sampling on instruction or cycles intervals because of different distribution of branches.

The disclosed edge profiling provides sampling of fixed amount of information in fixed (or fixed in average) branch-related intervals which allows generating of a reliable uniform edge profile.

GLOSSARY

The term "branch", as referred to herein, may relate to an instruction in a program code (or simply "a program") that may, when executed by a computer, cause the computer to begin execution of a different instruction sequence, i.e., to branch to a program counter other than the next instruction in the current instruction sequence. The term "branch" may relate to any type of a branch, including a conditional or an unconditional branch, a function call and a function return, a direct or an indirect branch and the like.

The term "completion of a branch" may refer to the act of executing a branch instruction by a computer. The branch may be then taken or not.

The term "taken branch", as referred to herein, may relate to an executed branch which caused the computer to begin execution of a different instruction sequence in a different memory location of the program other than the next instruction (i.e., perform branching).

The term "nontaken branch", as referred to herein, may relate to an executed conditional branch which was not taken since its condition was not satisfied. Instead, the computer may continue executing the current instruction sequence, beginning with the instruction that follows the conditional branch instruction.

The term "edge profile", as referred to herein, may relate to a profile that records the number of times branches in a program were taken or not taken.

The term "full branch trace", as referred to herein, may relate to a recording of multiple successive branches in a program during its execution, where the branches may be, for example, taken or nontaken.

The term "taken branch trace", as referred to herein, may relate to a recording of taken branches along specific executed path in a program.

The term "Taken Branch Trace Facility (TBTC)", may relate to a facility structured within contemporary hardware processors, configured to take snapshot of taken branch traces. Such facilities are available by various commercial names, like Branch History Rolling Buffer (BHRB) on the POWER8 processor by IBM Corp. or Branch Trace Buffer (BTB) on the Itanium 2 processor by Intel Corp. etc.

The terms "Taken Branch Trace (TBT) size" and "Chopped Branch Trace (CBT) size", may relate to the size of a taken branch trace and a chopped branch trace correspondingly, where the size is measured by number of branches.

Reference is now made to FIG. 1, which shows a flowchart of a method, constructed and operative in accordance with an embodiment of the disclosed technique. In a step 100, each occurrence of a hardware event may be counted during the execution of a target program code. The hardware event may be a completion of a branch or of an instruction of the target program code. The target program code may include multiple branches and multiple instructions. The program may be provided by a user in order to generate an edge profile for the program for purposes of feedback directed optimization. The target program code may refer to the target program's binary code stored in a storage device.

In some embodiments, the hardware event may be a completion of an instruction of the target program code. An additional normalization may be required in such cases due to differences in the size of the basic blocks of the target program code. Accordingly, the number of samples (i.e., taken branch traces) that were sampled in each basic block of the target program code may be then divided by the size of the basic block.

Figure 2:
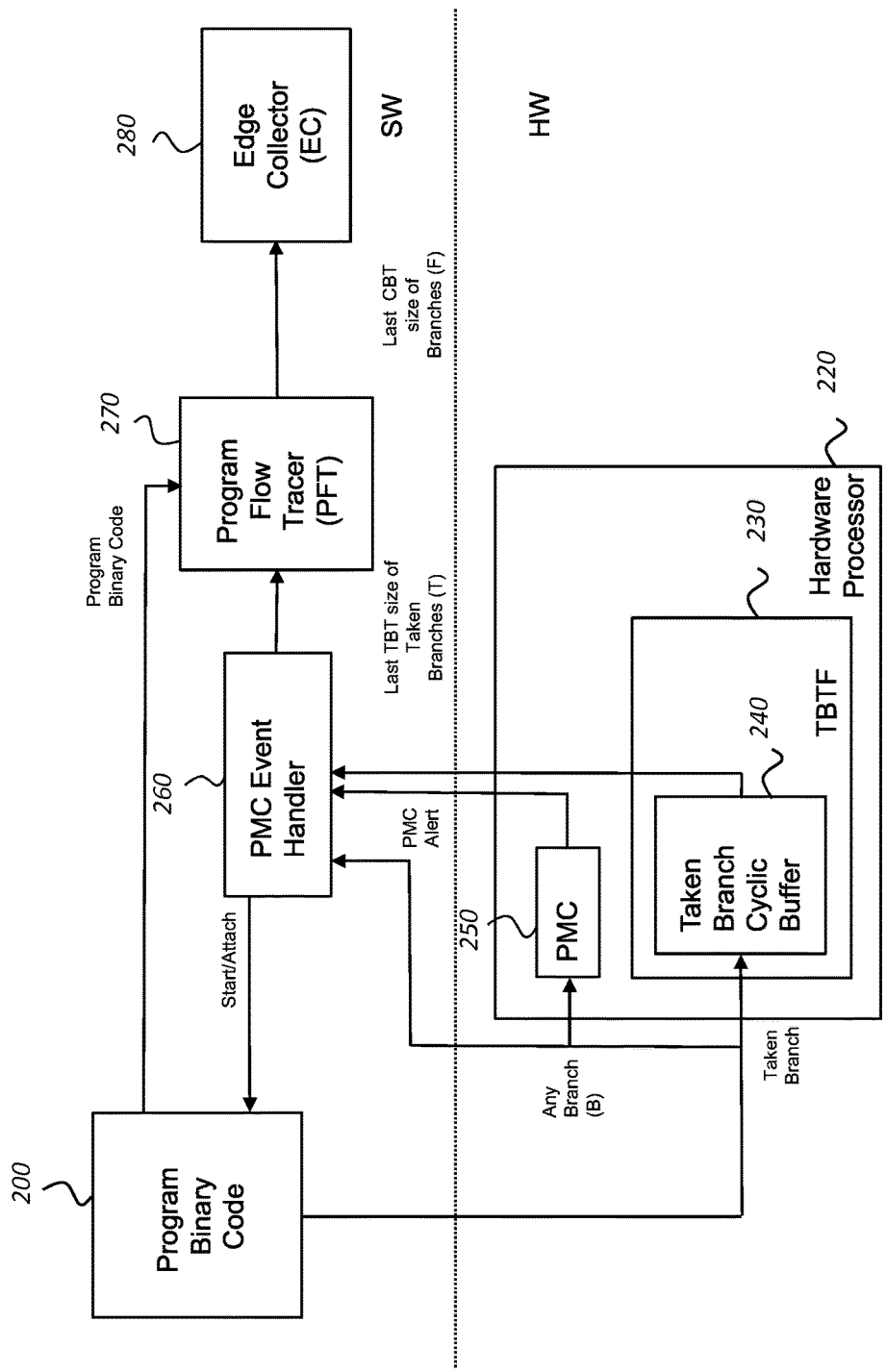
FIG. 2 shows a schematic diagram of an exemplary scheme of operation of hardware (a hardware processor) and software in accordance with the method of FIG. 1.

Reference is now made to FIG. 2, which shows a schematic diagram of an exemplary scheme of operation of hardware (a hardware processor) and software in accordance with the method of FIG. 1. The method of FIG. 1 may be at least partially implemented by a hardware processor. The hardware processor 220 may be provided by an underlying system. The hardware processor may include a Performance Monitoring Counter (PMC) 250. PMC 250 may be configured to count each completion of a branch in a program binary code 200 taken or nontaken, during the execution of program binary code 200. Program binary code 200 may include a target program code, to be optimized. PMC 250 may be a hardware performance counter as known in the art. Typical hardware processors may include a number of PMCs that may be attached to rich set of events that occur during execution (instruction completion, branch completion etc.).

In some embodiments, at the beginning of the program, a PMC event handler 260 may be attached to program binary code 200 (e.g., by a thread that runs program binary code 200) to be invoked on an alert by PMC 250. Event handler 260 may be a subroutine which may be invoked by PMC 250. Program binary code 200 may then start executing via the hardware processor, while the hardware processor counts each occurrence of a branch (indicated B) during the execution of program binary code 200 by PMC 250.

In a step 110, a predefined Taken Branch Trace (TBT) size of last taken branches (i.e., a predefined number of last taken branches) of the target program code may be orderly and continuously stored in a buffer during the program's execution. The TBT size of last taken branches may be stored in a cyclic manner, i.e., by using a buffer, which its size is equal to the TBT size, as it is connected end to end. With reference to FIG. 2, the hardware processor may further include a TBTF 230. TBTF 230 may include a taken branch cyclic buffer 240, which its size is equal to the TBT size. The hardware processor may store the TBT size of last taken branches in taken branch cyclic buffer 240 accordingly).

In a step 120, every time the counting (i.e., according to step 100) equals a sampling rate (i.e., sampling per number of completed branches), sampling of the buffer may be triggered to receive a taken branch trace including current TBT size last taken branches.

With reference to FIG. 2, PMC 250 may be configured to trigger sampling of TBTF 230 according to the sampling rate (i.e., the triggering event). When such event occurs, following a completion of a sampling rate branch instruction B (i.e., an Nth branch instruction while N equals the sampling rate), PMC 250 may issue a PMC alert to PMC event handler 260. PMC 250 may be preset to a chosen value (the sampling rate) and may be decremented every time a branch is completed. When PMC 250 reaches zero it may generate an interrupt allowing PMC event handler 260 to sample TBTF 230. PMC event handler 260 may then sample TBTF 230, retrieving the taken branch trace, indicated T. T may be an ordered list of TBT size of last taken branches, T[0: TBT size −1], where, for example, T[0] is the oldest branch recorded in taken branch cyclic buffer 240 and T[TBT size −1] is the most recent branch. PMC event handler 260 may transfer T to a Program Flow Tracer (PFT) 270. PFT 270 may be a piece of software executed as a thread, aimed at generating a trace of the program flow. PMC event handler 260 may then return, signaling TBTF 230 to resume operation. This is in order to minimize intervention in program execution. TBTF 230 may be typically disabled during the operation of PMC event handler 260 so that it would not count the activity of PMC event handler 260.

In some embodiments the sampling rate may be predefined. In some embodiments the sampling rate may be variable and fixed in average. The sampling rate may be fixed in average by setting its value to equal a predefined number summed with a randomly chosen delta and such that the sampling rate substantially equals the predefined number in average. The values of the randomly chosen delta may be substantially lower than the value of the predefined number in order to keep the sampling uniform. Thus, the value of the sampling rate may be variable but about the value of the predefined number. One may apply this approach in order to prevent synchronization with a piece of the target program code which may lead to a biased trace sample. Thus, PMC 250 may be configured to randomly select a delta every time a taken branch trace is generated. Furthermore, according to Chen et al, D. (n.d.). Taming Hardware Event Samples for FDO Compilation. Available at: http://www.australian-science.com.au/research/google/36358.pdf [Accessed 30 Oct. 2014], random sampling may improve the uniformity of the sampling even in the absence of synchronization.

The size of the cyclic buffer and the rate of the sampling may be a software setting of the hardware and may be per hardware thread or hardware core or Central Processing Unit (CPU), depending on the available hardware.

In a step 130, a full branch trace may be constructed for each taken branch trace based on the target program code. The full branch trace may include all of the completed branches of the target program code between and including the first and last taken branches of the taken branch trace. With specific reference to FIG. 2, for each taken branch trace T, PFT 270 may scan the code in program binary code 200 from the oldest branch in the taken branch trace T onward. PFT 270 may then record all the completed branches it may find, including taken and nontaken, as it goes through program execution flow as sampled in the taken branch trace T, thus constructing a full branch trace for each taken branch trace T.

Figure 3:
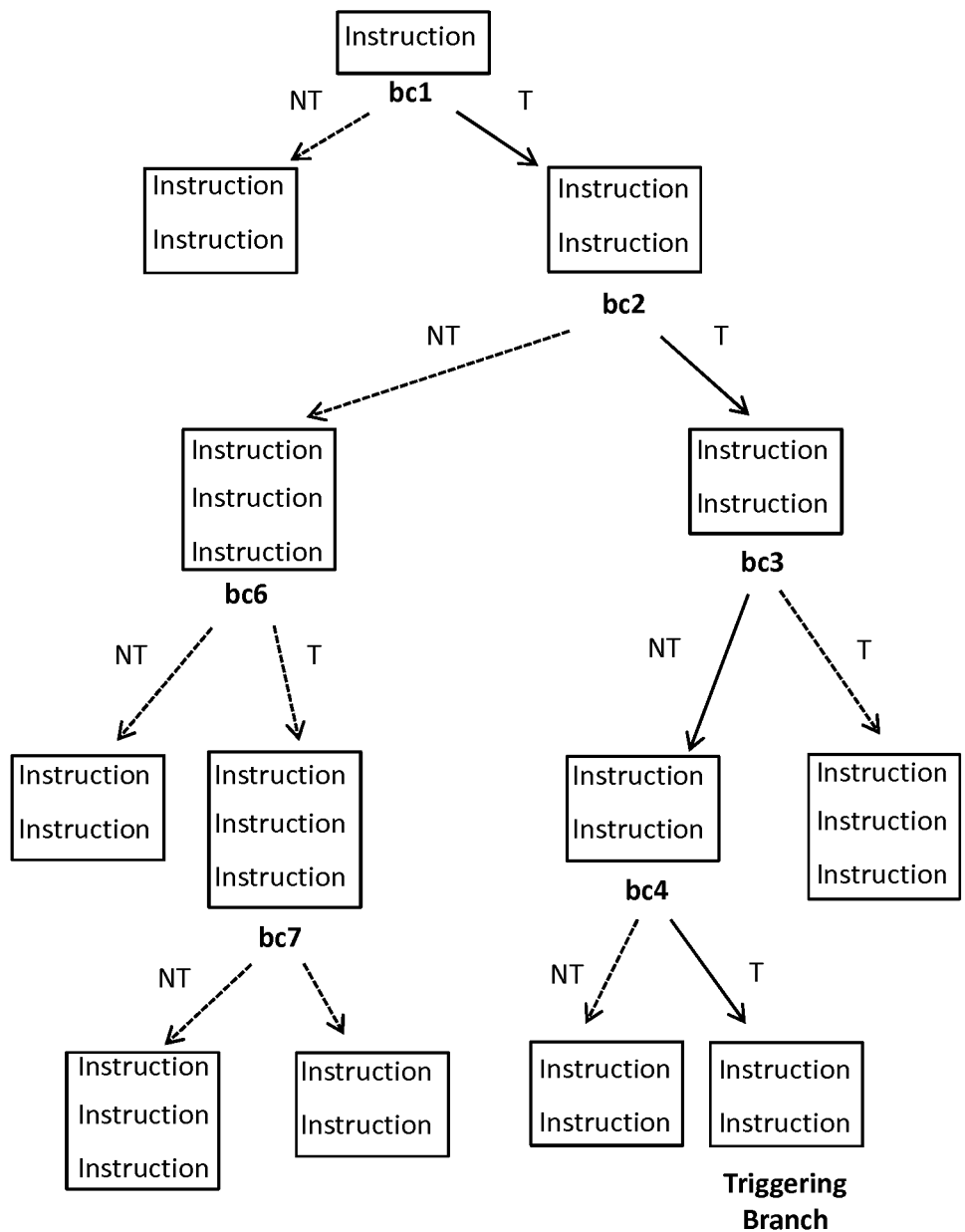
FIG. 3 shows a Control Flow Graph (CFG) of an exemplary program.

Reference is now made to FIG. 3, which shows a CFG of an exemplary program. The captions bc1, bc2 etc. indicate of conditional branches (i.e., "bc" stands for "branch conditional"). The caption T indicates of the option of taking the branch. The caption NT indicates of the option of not taking the branch. The solid lines indicate the actual program flow, i.e., which branches were completed and if they were taken or not. The striped lines indicate of the non-executed paths in the code. A full branch trace may be generated for this CFG, for example, in case TBT size equals 4 and the sampling rate is larger or equal to 5, which accordingly may include four taken branches: bc1, bc2, bc4 and the triggering branch (i.e., assuming the triggering branch is a taken branch), and five completed branches: bc1, bc2, bc3, bc4 and the triggering branch. The oldest taken branch is bc1 and the most recent taken branch is the triggering branch. All of the taken branches, i.e., bc1, bc2, bc4 and the triggering branch, may be extracted from the taken branch trace. The full branch trace may extend accordingly between the oldest taken branch, bc1, and the most recent taken branch, the triggering branch. The nontaken branches, i.e., bc3, may be extracted from the target program code.

In a step 140, a predefined Chopped Branch Trace (CBT) size of last branches (i.e., a predefined number of last branches) may be extracted from each full branch trace, to receive a chopped branch trace for each taken branch trace. The CBT size may be at most equal to the predefined TBT size in order to encompass the case when the branches in the full branch trace are all taken branches.

With reference to FIG. 2, PFT 270 may extract the last recorded CBT size of branches of each full branch trace, forming from them a chopped branch trace indicated F. PFT 270 may then transfer chopped branch trace F to an Edge Collector (EC) 280. EC 180 may keep counters for each executed edge (i.e., branch) in the program to count the number of times it was sampled. Such counters may be accessed, for example, by using conventional hashing, caching methods, or a CFG with weights on the edges. Advantageously, the CBT size may be defined to be as large as possible to allow collection of maximum information at each sampling instance and such that the CBT size is fixed, so as to achieve uniformity. Thus, the CBT size may correspond to the maximal number of branched that may be found in each taken branch trace, and therefore the CBT size may be defined to equal the TBT size. In some embodiments, when the branch instruction B that caused the alert (i.e., according to the sampling rate) is a nontaken branch, it may be appended to the full branch trace. Referring to FIG. 2, in such a case, PMC event handler 260 may complete the full branch trace from the last taken branch until B. Accordingly, the chopped branch trace F ends in B. If B may not be appended for some reason (e.g., it is not reliably recorded by the architecture) then there may be a minor biasing towards taken branches because the last branch in the sampled trace is always a taken branch.

In a step 150, each chopped branch trace may be incrementally stored in order to generate an edge profile of the target program code. With reference to FIG. 2, EC 280 may incrementally store each chopped branch trace in a storage device (not shown). EC 280 may then generate the resulting profile when or after program binary code 200 completes or during runtime, when requested.

According to the disclosed edge profiling, original taken branch trace T of TBT size of taken branches is turned into a CBT size branch sample F, by considering the last CBT size of such branches. Thus, when the TBTF is sampled at equal intervals, e.g., of executed branches, every time sampling exactly CBT size of such branches, one may receive a uniform edge profile. One may consider the complete trace of all branches executed during the run as one long string S of (taken or nontaken) branches. Sampling according to the sampling rate (e.g., each defined number of branches) and looking at the last CBT size of branches effectively samples S at fixed intervals (i.e., in terms of executed branches). Thus the probability of a branch to appear in a sampled trace may be the same as its proportion in S.

A system is further disclosed. The system may include a hardware processor. The hardware processor may operate according to the method of FIG. 1 and may be similar to the hardware processor of FIG. 2. The hardware processor may include a TBTC and at least one PMC. The TBTC may include a buffer. The TBTC may be configured to orderly and continuously store in the buffer a predefined TBT size of last taken branches during the executing of the target program code. The PMC may be configured, during the executing of the target program code, to count each occurrence of a hardware event and every time the count equals a sampling rate, to trigger sampling of the BTF, to receive a taken branch trace. The taken branch trace may include current predefined TBT size of last taken branches. The system may include one or more hardware processors configured to perform the method of FIG. 1.

The hardware processor may be configured, by executing dedicated software (i.e., including program code which will be herein referred to as the operating program code, as opposed to the target program code), to construct a full branch trace for each taken branch trace based on the target program code and extract a predefined CBT size of last branches from each full branch trace to receive a chopped branch trace for each taken branch trace. Furthermore, the hardware processor may be configured, by executing dedicated software, to incrementally store in a storage device each chopped branch trace to generate an edge profile of the target program code. In some embodiments, an additional separate hardware processor may execute the dedicated software to construct a full branch trace, generate a chopped branch trace and an edge profile. In some embodiments, the construction of a full branch trace, a chopped branch trace and an edge profile, as described above may be performed by hardware as well, such as the hardware processor.

In some embodiments, the edge profile may be a call-graph profile. A call-graph profile may be a subset of the edge profile that includes only function-call edges. A call-graph profile may be the basis for important function level optimization, like function-inlining. Since it is a smaller subset of the general edge profile, it may be sampled in higher frequency to receive more detailed call profile without additional overhead.

A call-graph profile may be generated in a similar manner to an edge profile, as described herein above, with the required modifications. For example, in such embodiments, the TBTF may be configured to record only direct and indirect function calls and the PMC may be configured to count all direct and indirect function calls.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    counting each occurrence of a hardware event by a Performance Monitoring Counter (PMC) of at least one hardware processor during the execution of a target program code, wherein each occurrence of each hardware event comprises any of: a taken and a not taken branch;
    orderly and continuously storing in a buffer of a Taken Branch Trace Facility (TBTC) of said at least one hardware processor a predefined Taken Branch Trace (TBT) size of last taken branches of said target program code during its execution;
    every time said counting of any of said taken and said not taken branches equals a sampling rate, triggering sampling of said buffer, to receive a taken branch trace comprising current said predefined TBT size of last taken branches, wherein: (a) said sampling rate is variable and fixed in average, (b) said sampling rate value equals a predefined number summed with a randomly chosen delta, and (c) the values of said randomly chosen delta are substantially lower than the value of said predefined number;
    constructing a full branch trace for each said taken branch trace based on said target program code, wherein said full branch trace comprises all of the completed branches of said target program code between the first and last taken branches of said taken branch trace and including the first and last taken branches of said taken branch trace;
    extracting a predefined Chopped Branch Trace (CBT) size of last branches from each said full branch trace, to receive a uniform chopped branch trace for said each taken branch trace; and
    incrementally storing each said uniform chopped branch trace to generate a uniform edge profile of said target program code.

2. The method according to claim 1, wherein the storing of said predefined TBT size of last taken branches is performed in a cyclic manner.

3. The method according to claim 1, wherein, when a nontaken branch is completed, said counting equals said sampling rate, and wherein said method further comprises appending the nontaken branch to the full branch trace.

4. The method according to claim 1, wherein the edge profile is a call-graph profile and the branch is a function call.

5. The method of claim 1, wherein the occurrence of a hardware event is a completion of a branch of the target program code.

6. The method of claim 1, wherein the occurrence of a hardware event is a completion of an instruction of the target program code.

7. A computer program product comprising a non-transitory computer-readable storage medium having operating program code embodied therewith, the operating program code executable by at least one hardware processor, wherein the at least one hardware processor is configured to:

count each occurrence of a hardware event during the execution of a target program code, wherein each occurrence of each hardware event comprises any of: a taken and a not taken branch;

orderly and continuously store in a buffer a predefined Taken Branch Trace (TBT) size of last taken branches of said target program code during its execution; and every time said counting of any of said taken and said not taken branches equals a sampling rate, trigger sampling of said buffer, to receive a taken branch trace comprising current said predefined TBT size of last taken branches, wherein: (a) said sampling rate is variable and fixed in average, (b) said sampling rate value equals a predefined number summed with a randomly chosen delta, and (c) the values of said randomly chosen delta are substantially lower than the value of said predefined number, and wherein the operating program code is executable by the at least one hardware processor to:

construct an full branch trace for each said taken branch trace based on said target program code, wherein said full branch trace comprises all of the completed branches of said target program code between the first and last taken branches of said taken branch trace and including the first and last taken branches of said taken branch trace;

extract a predefined, Chopped Branch Trace (CBT) size of last branches from each said full branch trace, to receive a uniform chopped branch trace for said each taken branch trace; and incrementally store each said uniform chopped branch trace to generate a uniform edge profile of said target program code.

8. The computer program product of claim 7, wherein the storing of said predefined TBT size of last taken branches is performed in a cyclic manner.

9. The computer program product of claim 7, wherein, when a nontaken branch is completed, said counting equals said sampling rate, and wherein said operating program code is further executable by the at least one hardware processor to append the nontaken branch to the full branch trace.

10. The computer program product of claim 7, wherein the edge profile is a call-graph profile and the branch is a function call.

11. The computer program product of claim 7, wherein the occurrence of a hardware event is selected from a group consisting of: a completion of a branch of the target program code and a completion of an instruction of the target program code.

12. A system comprising at least one hardware processor, the at least one hardware processor comprising:

a Taken Branch Trace Facility (TBTC) comprising a buffer, the TBTC configured to orderly and continuously store in said buffer a predefined TBT size of last taken branches of multiple branches of a target program code during its executing;

a Performance Monitoring Counter (PMC) configured, during the executing of said target program code, to:

a. count each occurrence of a hardware event, comprising any of: a taken and a not taken branch, and b. every time said count of any of said taken and said not taken branches equals a sampling rate, trigger sampling of said BTF, to receive a taken branch trace comprising current said predefined TBT size of last taken branches, wherein: (a) said sampling rate is variable and fixed in average, (b) said sampling rate value equals a predefined number summed with a randomly chosen delta, and (c) the values of said randomly chosen delta are substantially lower than the value of said predefined number, wherein the hardware processor is configured, by executing an operating program code, to:

construct a full branch trace for each taken branch trace based on said target program code, wherein said full branch trace comprises all of the completed branches of said target program code between and the first and last taken branches of said taken branch trace and including the first and last taken branches of said taken branch trace, extract a predefined CBT size of last branches from each said full branch trace, to receive a uniform chopped branch trace for said each taken branch trace, and incrementally store in a storage device each said uniform chopped branch trace to generate a uniform edge profile of said target program code.

13. The system of claim 12, wherein the buffer is cyclic.

14. The system of claim 12, wherein, when a nontaken branch is completed, said counting equals said sampling rate, and wherein said at least one hardware processor is further configured, by executing said operating program code, to append the nontaken branch to the full branch trace.

15. The system of claim 12, wherein the edge profile is a call-graph profile and the multiple branches are function calls.

16. The system of claim 12, wherein the occurrence of a hardware event is selected from a group consisting of: a completion of a branch of the target program code and a completion of an instruction of the target program code.

\* \* \* \* \*